(12) United States Patent
Lafon et al.

(10) Patent No.: US 11,048,079 B2
(45) Date of Patent: Jun. 29, 2021

(54) METHOD AND SYSTEM FOR DISPLAY AND INTERACTION EMBEDDED IN A COCKPIT

(71) Applicant: THALES, Courbevoie (FR)

(72) Inventors: Stéphanie Lafon, Merignac (FR); Alexiane Bailly, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/700,804

(22) Filed: Dec. 2, 2019

(65) Prior Publication Data

US 2020/0183154 A1    Jun. 11, 2020

(30) Foreign Application Priority Data

Dec. 5, 2018    (FR) ..................................... 18 72329

(51) Int. Cl.
  *G06F 3/12*    (2006.01)
  *G02B 27/00*    (2006.01)
  *G02B 27/01*    (2006.01)
  *G06F 3/01*    (2006.01)

(52) U.S. Cl.
  CPC ..... *G02B 27/0093* (2013.01); *G02B 27/0149* (2013.01); *G02B 27/0179* (2013.01); *G02B 27/0189* (2013.01); *G06F 3/012* (2013.01); *G02B 2027/0165* (2013.01); *G02B 2027/0187* (2013.01)

(58) Field of Classification Search
  None
  See application file for complete search history.

(56) References Cited

U.S. PATENT DOCUMENTS

| 9,489,018 | B2 * | 11/2016 | Gettemy | ............... G06F 1/1677 |
| 10,598,932 | B1 * | 3/2020 | Marshall | ............ G02B 27/0176 |
| 10,761,676 | B1 * | 9/2020 | Gilbert | ..................... G09G 5/14 |
| 2007/0132662 | A1 * | 6/2007 | Morita | .................. G06T 19/006 345/8 |

(Continued)

FOREIGN PATENT DOCUMENTS

FR    3018119 A1    9/2015

OTHER PUBLICATIONS

French Search Report issued by the French Patent Office in corresponding French Application No. 1872329, dated Sep. 17, 2019.

*Primary Examiner* — Patrick F Valdez
(74) *Attorney, Agent, or Firm* — Arent Fox LLP

(57) ABSTRACT

The invention relates to a method and system for display and interaction with an aircraft control system, intended for an aircraft pilot, embedded in a cockpit of the aircraft. The method is implemented by a system for display and interaction including a first so-called head-down man-machine interface and a second so-called head-up man-machine interface. The method includes determining a line of sight of the pilot, receiving a command to enter the frozen display mode and keeping at least part of the display on the second man-machine interface in a frozen position, independently of the pilot's line of sight, then displaying at least one complementary man-machine interface element, as a function of the pilot's line of sight, in at least one free area of the cockpit, and displaying a cursor representative of the pilot's line of sight.

12 Claims, 4 Drawing Sheets

(56) References Cited

U.S. PATENT DOCUMENTS

| | | | |
|---|---|---|---|
| 2009/0112469 A1* | 4/2009 | Lapidot | G01C 23/00 701/469 |
| 2012/0120070 A1* | 5/2012 | Baillot | G06F 3/012 345/419 |
| 2016/0012612 A1 | 1/2016 | Koga | |
| 2017/0092002 A1* | 3/2017 | Mullins | G02B 27/0172 |
| 2019/0346678 A1* | 11/2019 | Nocham | H04W 4/029 |
| 2019/0375292 A1* | 12/2019 | Saito | G06F 3/04847 |

* cited by examiner

METHOD AND SYSTEM FOR DISPLAY AND INTERACTION EMBEDDED IN A COCKPIT

CROSS-REFERENCE TO RELATED APPLICATIONS

This application claims priority to French Patent Application No. 18 72329, filed on Dec. 5, 2018. The disclosure of the priority application is incorporated in its entirety herein by reference.

FIELD OF THE INVENTION

The present invention relates to a method and system for display and interaction with an aircraft control system, intended for an aircraft pilot, embedded in a cockpit of the aircraft.

The present invention is situated in the field of the interaction with aircraft control systems.

BACKGROUND OF THE INVENTION

In a known manner, an aircraft includes a cockpit in which systems are embedded for display and interaction with a control system of the aircraft. Here, an aircraft control system refers both to the control of piloting devices and to the control of any embedded device (sensors, earphones, cameras, etc.).

In a known manner, in the cockpit, the display and interaction system includes a first subsystem, called head-down, and a second subsystem, called head-up, conventionally suitable for viewing without interaction. For example, the second subsystem is implemented by a device worn by the or each pilot, such as a headset with visor or a device for projecting additional information on the windshield of the aircraft or on a transparent strip dedicated to that effect, for example a head-up display device.

Conventionally, the first subsystem includes physical control and/or interaction devices (buttons, rotator controls, control sticks, trackballs), able to be manipulated by the pilot(s), and display devices such as screens, for example, or display and interaction devices such as touchscreens.

The piloting is done by one or several pilots (for example, two pilots), who have access to the display and interaction devices of these subsystems.

It is further known to add a device configured to determine a line of sight of the pilot, for example by monitoring the head position and deducing a line of sight or monitoring the direction of the pilot's gaze, so as to improve certain displays as a function of the line of sight, and therefore the field of view of the pilot.

In the case of a single active pilot, the latter is called upon to alternate between the head-up position, in particular in piloting phases, and the head-down position, in mission management and programming phases of the piloting devices and embedded devices. In addition to the change in position, this involves a change in display and interaction interface, and the pilot is obligated to abandon certain controls of one of the subsystems temporarily in order to access the controls of the other subsystem.

This operation, in particular in the case of a single active pilot, is tiresome and can be critical for certain operations.

The invention aims to resolve these drawbacks, by proposing a system making it possible to achieve continuity between the two display and interaction subsystems.

SUMMARY OF THE INVENTION

To that end, according to one aspect, the invention relates to a method for display and interaction with an aircraft control system suitable for an aircraft pilot, implemented by a display and interaction system embedded in a cockpit of the aircraft and including a first man-machine interface called head-down and a first controller suitable for controlling the display of said first man-machine interface, and a second man-machine interface called head-up, and a second controller suitable for controlling the display on said second man-machine interface, the display and interaction system further including a device configured to determine the line of sight of the pilot as a function of a position of the head and/or eyes of the pilot, the second controller being configured in order, in a first standard display mode, to adapt at least one display on the second man-machine interface as a function of the pilot's line of sight. The method includes the following steps:

determining a line of sight of the pilot, receiving a command to enter the frozen display mode and to keep at least part of the display on the second man-machine interface in a frozen position, independently of the pilot's line of sight, displaying at least one complementary man-machine interface element, as a function of the pilot's line of sight, in at least one free area of the cockpit, and displaying a cursor representative of the pilot's line of sight.

Advantageously, the proposed display and interaction method makes it possible to obtain a display continuity, and therefore to obtain a unified display having improved usage ergonomics for the interaction.

The display and interaction method according to the invention may have one or more of the features below, considered independently or in combination, according to all technically acceptable combinations.

The method includes, after said reception of a command to enter the frozen display mode, a display adaptation on the first man-machine interface and on the second man-machine interface.

The method further includes a step for monitoring a change of direction of the pilot's line of sight, and in case of change, a step for adapting the display of complementary man-machine interface elements as a function of the change.

When at least one complementary element is a menu including selectable commands, the method further including a step for selecting a command as a function of the pilot's line of sight, and a command confirmation.

The method includes determining a field of view of the pilot as a function of the determined line of sight, and said at least one complementary man-machine interface element is displayed in a free area located in the pilot's field of view.

The at least one part of the display maintained on the second man-machine interface contains non-geolocated information.

The free area(s) are determined as a function of stored configuration information relative to the cockpit.

The display of at least one complementary element is done in at least one free area chosen as a function of the configuration information and the pilot's line of sight upon reception of the command to enter frozen mode.

According to another aspect, the invention relates to a system for display and interaction with an aircraft control system suitable for an aircraft pilot, embedded in a cockpit of the aircraft including a first man-machine interface called head-down and a first controller suitable for controlling the display of said first man-machine interface, and a second man-machine interface called head-up, and a second controller suitable for controlling the display on said second man-machine interface. This system further includes a device configured to determine the line of sight of the pilot as a function of a position of the head and/or eyes of the pilot, the second controller being configured in order, in a first standard display mode, to adapt at least one display on the second man-machine interface as a function of the pilot's line of sight. The system further includes a control member able to be actuated by the pilot in order to enter a frozen display mode, the second controller maintaining at least part of the display on the second man-machine interface in a frozen position independently of the pilot's line of sight, and a third controller suitable for displaying at least one complementary man-machine interface element, as a function of the pilot's line of sight, in at least one free area of the cockpit, the system further being configured to display a cursor representative of the pilot's line of sight.

According to another aspect, the invention relates to a computer program including software instructions which, when executed by an electronic computing device, implement a display and interaction method as briefly described above.

According to another aspect, the invention relates to an information medium, on which software instructions are stored which, when executed by an electronic computing device, implement a display and interaction method as briefly described above.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

Figure 1:
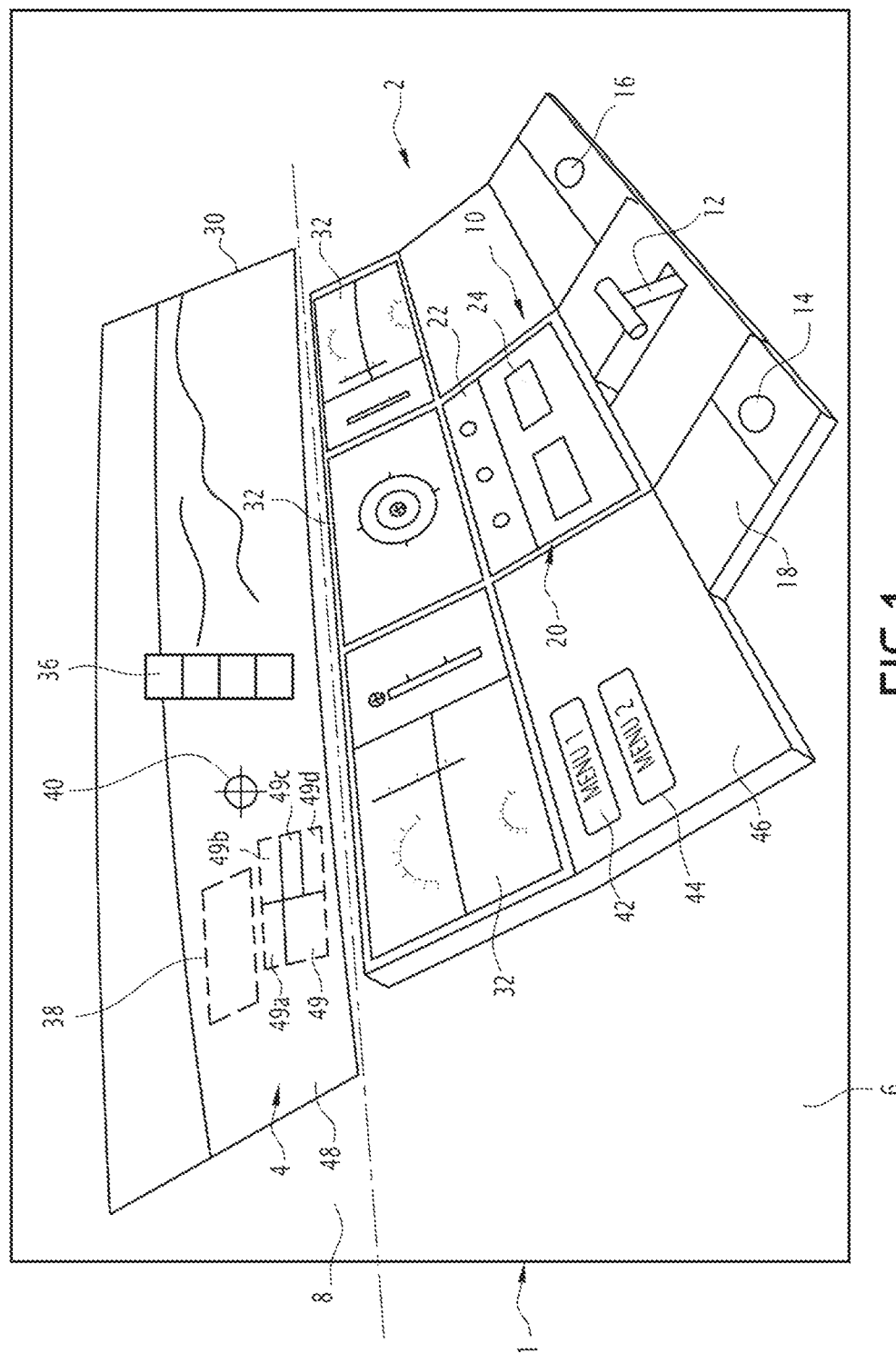
FIG. 1 is a schematic illustration of a system for display and interaction with an aircraft control system embedded in a cockpit.

FIG. 1 schematically illustrates a portion of an aircraft cockpit 1, comprising a system 2 for display and interaction with an aircraft control system (not shown) embedded according to one embodiment of the invention.

It is an aircraft cockpit, for example of an airplane or helicopter.

The system 2 illustrated in FIG. 1 is visible and accessible to the pilot or to each pilot of the aircraft (not shown in the figure).

In the remainder of the description, the aircraft is considered to be piloted by a single pilot. Of course, the invention will apply similarly in the case of piloting by several pilots, for example in the presence of a pilot and a copilot.

The cockpit portion illustrated in FIG. 1 includes a windshield 4, conventionally made from a transparent material and making it possible to view the landscape outside the aircraft.

The cockpit includes a first part 6 in which the first so-called head-down man-machine interface and a second so-called head-up part 8, corresponding to the head-up view, are located. The windshield 4 is located in the second part.

In order to view the man-machine interfaces of the first and second parts of the cockpit, the pilot must orient his gaze and therefore move his field of view.

The field of view is defined in a known manner as being a cone around the pilot's line of sight, defined in a three-dimensional coordinate system. In a horizontal plane, the field of view is defined by an angular sector centered on the optical axis. When the head is still and the line of sight is oriented in a given direction, the field of view is defined by a first angle of between 160° and 180° on either side of the line of sight in a first plane (movement of the gaze to the left or to the right), and in a second plane, a second angle of between 45 to 50° upward, a third angle of between 60° and 80° downward.

Thus, the pilot can move his head comfortably with angles of +/−45° in the first plane and +/−30° and the second plane, forming a field of regard (FOR).

Located in the first part 6 of the cockpit are several man-machine interface elements, belonging to a first man-machine interface (MMI) 10.

In the illustrated example, the first MMI comprises conventional physical interactors: a control stick 12, interaction buttons 14, 16. Of course, the list is not exhaustive, other physical interactors not shown being able to be present, for example rotator controls, sidesticks, trackballs, microphones, etc.

The first MMI 10 includes display and/or interaction devices: viewing screens 18, 32, touchscreens 20 allowing viewing and interaction.

For example, on such touchscreens 20, several interaction elements 22, 24 are displayed, selectable by the pilot by a tactile command (for example, touching the interaction element with a finger, or pressing, then sliding toward another position of the touchscreen). Such display and interaction elements are known.

For example, the screens 32 make it possible to display useful information for navigation and piloting: position of the aircraft, flight constraints, imposed waypoints of the airway to be followed, map of the overflown terrain, information coming from remote control centers, etc.

Figure 2:
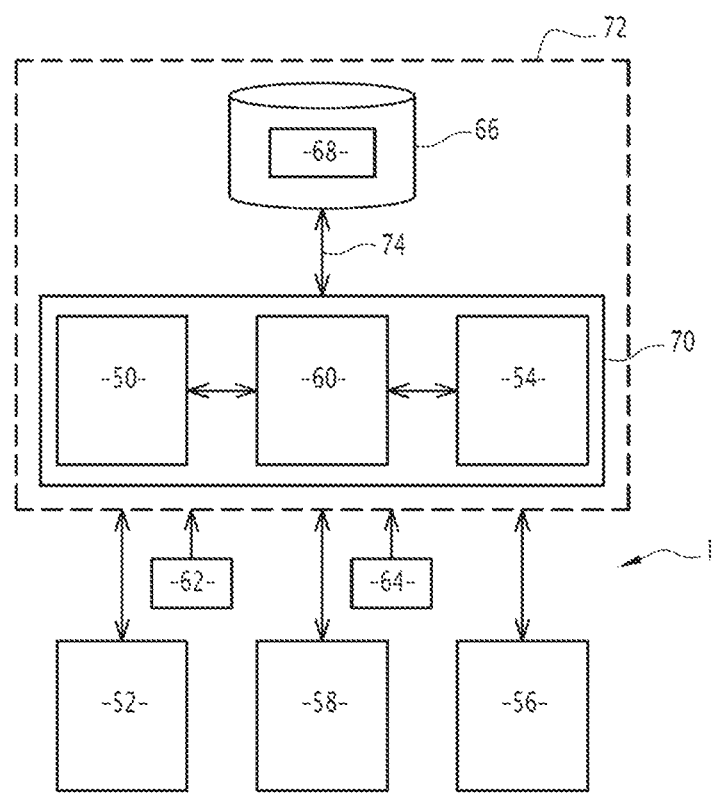
FIG. 2 is a block diagram of functional blocks of a system for display and interaction with an aircraft control system according to one embodiment.

The commands thus done are received and implemented owing to a first man-machine interface controller, illustrated in FIG. 2.

The system 2 comprises a second MMI 30, also called head-up MMI, comprising display elements 36, 38 that are displayed for example superimposed on the scene visible through the windshield, directly on the windshield or on an added transparent strip positioned in front of the pilot's eyes. The display elements 36, 38 also comprise information useful for navigation and piloting. The displayed information includes so-called conformal information that is geo-located and so-called nonconformal information that is not geolocated. This information is for example conformal information generated by a CVS system (Combined Vision System) merging information coming from databases and sensors (e.g., terrain, obstacles, landing strip, etc.). The nonconformal information is for example data useful for piloting (speed, heading, altitude) and navigation (next waypoint, active radiofrequency, etc.).

It should be noted that at least some of the conformal and nonconformal information can be displayed on viewing screens of the first MMI 10.

The display elements 36, 38 are viewed for example by means of a device for displaying augmented reality elements, for example a viewing screen suitable for being placed in front of the pilot's eyes (glasses or headset with visor, or HUD device or device for projection on the windshield).

Advantageously, owing to the invention, the system for display and interaction 2 is further configured to display complementary man-machine interface elements, and in particular interaction elements, in free areas of the cockpit 1, which are not used by the first MMI 10 or by the second MMI 30.

These free areas are areas that are not already used for the displays and that do not contain a physical or touch-sensitive interactor. In other words, a free area is an area that is not already used by a display or interaction element of the man-machine interface.

For example, FIG. 1 shows the complementary MMI elements 42, 44 that are added in a free area 46 of the first part 6 of the cockpit, to make it possible to improve the continuity during a passage from the head-up view to the head-down view. For example, the free area 46 is embodied by an opaque planar surface on which it is possible to perform a rear screen projection.

One example of a complementary MMI element 49, containing sub-elements 49a, 49b, 49c, 49d, which are for example interaction submenus, has been illustrated in the second cockpit part 8.

In the second part 8 of the cockpit, free areas 48 are unused areas of the physical head-up display supports, for example of the windshield or the visor of the headset.

Additionally, smooth opaque areas for example belonging to walls of the cockpit are also usable as free areas.

Additionally, a cursor 40 indicative of the pilot's line of sight at a given moment is added superimposed in the MMI 30. Its use in the method for display and interaction with an aircraft control system according to the invention will be described in more detail hereinafter. The cursor 40 follows the changes of the pilot's line of sight.

In one embodiment, an eye tracking system is implemented. In this case, the line of sight is combined with the direction of the gaze, which is projected on the MMI 30.

In a variant, a head-tracking system of the pilot is implemented. In this case, a line of sight is calculated from the position of the head, and displayed for example on the visor of the headset worn by the pilot.

The term "line of sight" is used in both embodiments, both to designate the direction of the gaze and the line of sight of the pilot's head.

From the pilot's point of view, the cursor 40 is displayed in front of him homogeneously on all of the man-machine interfaces, in order to allow him to interact with all of the interactive areas that are presented to him as explained in more detail hereinafter.

The complementary elements 42, 44 are for example menus allowing the pilot to carry out interactive commands.

FIG. 2 is a block diagram of the main functional blocks of a system 1 for display and interaction with an aircraft control system according to one embodiment.

The system 2 comprises a first controller 50 of a man-machine interface, configured to control the devices 52 for display and interaction belonging to the first head-down MMI 10, in particular the screens and touchscreens. The first controller 50 is in particular configured to command the display on the screens/touchscreens of the first MMI and to recover commands of the interaction devices of the first MMI 10.

The system 2 also comprises a second controller 54 of a man-machine interface, configured to control the device 56 for displaying augmented reality elements in the second head-up MMI. For example, the device 56 is a viewing screen suitable for being placed in front of the pilot's eyes (augmented reality glasses or headset with visor), for example a device of the HMD (Head-Mounted Display) type or a device for projection on the windshield.

Lastly, the system 2 includes a third man-machine interface controller 60, suitable for controlling the display in the free areas.

The system further includes a device 58 configured to determine a line of sight of the pilot as a function of a position of the head and/or eyes of the pilot, at a predetermined frequency, for example greater than or equal to 50 Hz in order to avoid display lags due to the movements of the head.

In one embodiment, the device 58 is part of an augmented reality headset worn by the pilot. In a variant, the device 58 includes cameras and software for processing images configured to compute, substantially in real time, the position and orientation of the head and/or the direction of the pilot's gaze.

Information characterizing the line of sight is sent to the first controller 50, the second controller 54 or the third controller 60.

The system includes a control member 62, for example a pushbutton or a button selectable on a touchscreen making it possible to select a display mode between a first "standard" mode and a second "frozen" mode.

The display mode selected by the pilot is sent to all of the controllers 50, 54, 60.

In the standard display mode, the second controller 54 is configured to display, in the second MMI, piloting and navigation information as a function of the line of sight of the pilot and the attitude of the aircraft carrying the system.

In the frozen display mode, the non-geolocated information is displayed in a frozen manner, without tracking the pilot's line of sight.

Furthermore, advantageously, the third controller 60 is configured to display, as a function of the pilot's line of sight, additional elements of the man-machine interface in the free areas.

The system 2 further includes a voice control interface 64, suitable for receiving and interpreting voice control orders sent to the controllers 50, 54, 60.

Furthermore, the system 2 includes a memory 66 suitable in particular for storing information 68 relative to the configuration of the cockpit, for example by the depiction in a 3D coordinate system. The information 68 in particular includes position information of the MMIs, information relative to the areas including smooth surfaces suitable for serving as support for projecting images in the cockpit. According to one embodiment, the information 68 comprises coordinates in the 3D coordinate system of the free areas determined as a function of the 3D depiction of the inside of the cockpit.

In one embodiment, the first controller 50, the second controller 54 and the third controller 60 are each made in the form of software, or a software component executable by a processor 70 of an electronic computing device 72, for example an on-board computer. The processor 70 and the memory 66 are suitable for communicating via a communication bus 74.

This software is further suitable for being stored on a computer-readable medium, not shown. The computer-readable medium is for example a medium suitable for storing the electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

In a variant that is not shown, the first controller 50, the second controller 54 and the third controller 60 are each made in the form of a programmable logic component, such as an FPGA (Field Programmable Gate Array), a GPU (graphics processing unit) or a GPGPU (General-purpose processing on graphics processing), or in the form of a dedicated integrated circuit, such as an ASIC (Application-Specific Integrated Circuit).

Figure 3:
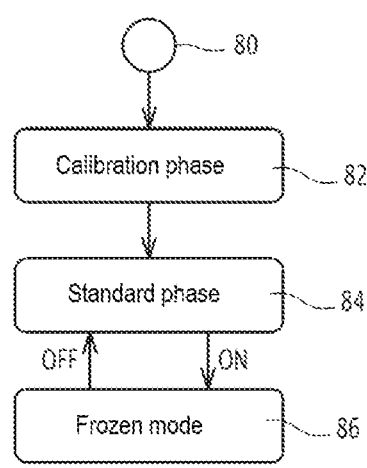
FIG. 3 is an overall diagram of operating states of a system for display and interaction with an aircraft control system according to one embodiment.

FIG. 3 is an overall diagram of operating states of a system for display and interaction with an aircraft control system according to one embodiment.

After all of the cockpit devices are powered on (phase 80), a first calibration phase 82 is implemented.

The calibration in particular comprises calibrating the device 58 for determining the line of sight in cooperation with the device 56 for displaying augmented reality elements, as a function of information 68 relative to the configuration of the cockpit. The calibration depends on physical characteristics of the pilot, his position on the seat. It is done by methods known from the state of the art, depending on the type of device 58 used.

Following this calibration phase 82, it is possible to obtain the pilot's line of sight at any moment and therefore to determine the pilot's field of view.

The system 2 is configured to perform displays on the man-machine interfaces 52, 56 according to two distinct modes called "standard" mode (phase 82) and "frozen" mode (phase 84). The passage from one to the other of these modes, illustrated by arrows in FIG. 3, is done by command from the pilot using the control member 62.

The "standard" display mode includes the conventional display of information useful for navigation, of the tactile interaction elements on the first MMI 52 in particular, and the display of augmented reality information on the second head-up MMI 56, as a function of the pilot's line of sight determined by the device 58.

The "frozen" display mode is modified according to the invention, as explained in more detail hereinafter.

Figure 4:
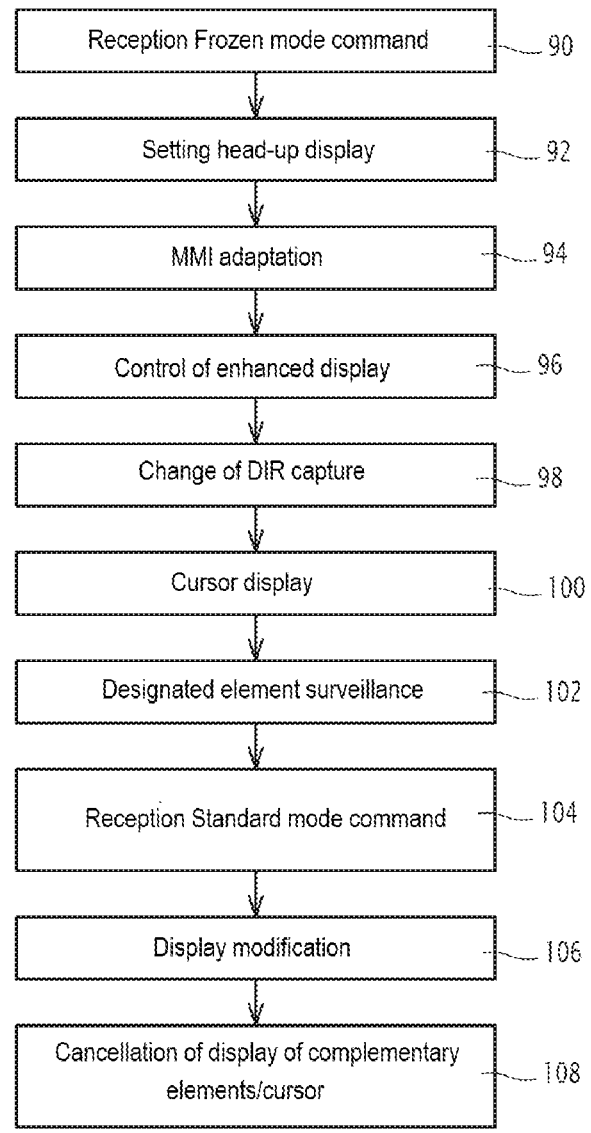
FIG. 4 is a block diagram of the main steps of a system for display and interaction with an aircraft control system according to one embodiment.

FIG. 4 is a block diagram of the main steps of a system for display and interaction with an aircraft control system according to one embodiment. The method is implemented by the first controller 50, the second controller 54 and the third controller 60 as explained above.

The method is implemented in a system including a device for determining the pilot's line of sight that transmits, at a given frequency, information relative to the position of the head and/or the gaze of the pilot in a predetermined coordinate system associated with the cockpit. The line of sight is for example defined by the coordinates of a vector in the predetermined coordinate system.

The method includes a step 90 for receiving a command to enter the frozen display mode, the command coming from the pilot. It for example involves pressing on a button 62. This received command is sent to each of the controllers.

Following this command, in step 92, the second head-up controller sets, on the head-up man-machine interface, the elements displaying nonconformal information. This display no longer tracks the movement of the head and therefore the line of sight of the pilot. Optionally, the conformal information displays are eliminated to lighten the MMI.

Step 92 is followed by a step 94 for adapting the first and second man-machine interfaces, carried out both by the first controller and by the second controller. The adaptation comprises a display modification of the interaction elements, for example their enlargement to facilitate the interaction.

Next, a step 96 for controlling the display of complementary man-machine interface elements in free areas is implemented by the third controller. The complementary MMI elements are displayed in free areas. The free areas are determined from information relative to the configuration of the cockpit stored beforehand, and from the line of sight of the pilot upon reception of the command (step 90).

For example, in the second head-up MMI, the displayed nonconformal information is frozen (step 92) according to the direction of the gaze/position of the head of the pilot at the time of reception of the command to enter "frozen" mode, and the complementary available free areas for the available display are next determined.

Step 96 makes it possible to perform a display in augmented reality simultaneously on the first MMI, on the second MMI, and in free areas suitable for displaying information belonging to the cockpit but located outside the first and second MMIs, so as to form an extended man-machine interface.

Preferably, the display of the complementary interface elements depends on the pilot's line of sight, denoted DIR.

The complementary MMI elements are for example quick accesses/interactions to useful information for the mission that are typically accessible via the first head-down MMI only (e.g., change of radio frequency, synthetic view of a flight plan portion, information on the destination airport, diversion assistance, etc.).

Advantageously, this makes it possible to offer the pilot an extended, effective and ergonomic MMI, allowing them to access all information and to interact quickly with the control system, without taking his hands off the physical piloting interactors, and making few roundtrips between the head-up and head-down positions. The pilot can focus on what he sees outside.

Preferably, the complementary elements are displayed in free areas chosen so as to be in the pilot's field of view, and preferably in the field of regard.

Preferably, the complementary elements are elements allowing an interaction, for example with control menus 49, including submenus 49a, 49b, 49c, 49d.

These complementary elements are for example displayed on the windshield of the aircraft, a headset screen worn by the pilot or on a flat area of the head-down part of the cockpit.

A change of direction (DIR) of the pilot's line of sight is captured in step 98, and the new direction of the line of sight is sent to each of the controllers.

Step 98 is followed, in one embodiment, by a display (step 100) of the cursor representative of the pilot's line of sight DIR. For example, the display of the cursor is managed by the second controller. In a variant, the display of the cursor is done by the first controller when the direction DIR points toward the first part of the cockpit, and by the second controller when the direction DIR points toward the second head-up part of the cockpit.

In step 102, each controller determines, in real time, whether the direction DIR designates an element displayed in the display area that it controls. In case of positive determination, the display is adapted, for example a command associated with the designated element is displayed. For example, a visual indication (for example highlighting, blinking display) will be displayed in order to indicate to the pilot with which displayed complementary element he can interact. The pilot will be able to perform a command, for example by stating a voice command.

This allows the pilot to designate/select a displayed element through his gaze, and to confirm the designation by another means, for example a manual command and/or a voice command. Thus, advantageously, the ergonomics are improved.

Next, if a command is received to enter the standard display mode (step 104) and the display is modified (step 106) to enter standard display mode.

In step 108, the complementary elements of the man-machine interface are displayed on the unoccupied areas, and the cursor representative of the pilot's line of sight are removed. The conformal information of the head-up reappears, the nonconformal information is displayed again in the pilot's field of view, preferably the display is done so as to avoid the element of surprise. The MMIs that were displayed specifically to facilitate the interaction return to the standard display.

The invention claimed is:

1. A method for display and interaction with an aircraft control system suitable for an aircraft pilot, implemented by a display and interaction system embedded in a cockpit of the aircraft and including a first man-machine interface called head-down and a first controller suitable for controlling a display of the first man-machine interface, and a second man-machine interface called head-up, and a second controller suitable for controlling a display on the second man-machine interface, the display and interaction system further including a device configured to determine a line of sight of the pilot as a function of a position of the head and/or eyes of the pilot, the second controller being configured in order, in a first standard display mode, to adapt at least one display on the second man-machine interface as a function of the pilot's line of sight,
the method comprising:
determining a line of sight of the pilot,
receiving a command to change the display mode from the first standard display mode to a second frozen display mode, and,
in the second frozen display mode, maintaining at least part of the display on the second man-machine interface in a frozen position, independently of the pilot's line of sight,
displaying at least one complementary man-machine interface element, as a function of the pilot's line of sight, in at least one free area of the cockpit, a free area being an area which is not already used by a display or interaction element, and
displaying a cursor representative of the pilot's line of sight.

2. The method according to claim 1, comprising, after receiving the command to change the display mode from the first standard display mode to the second frozen display mode, a display adaptation on the first man-machine interface and on the second man-machine interface.

3. The method according to claim 1, further comprising monitoring a change of direction of the pilot's line of sight, and in case of change, adapting the display of complementary man-machine interface elements as a function of the change of direction of the pilot's line of sight.

4. The method according to claim 1, wherein at least one complementary element is a menu including selectable commands, the method further comprising selecting a command as a function of the pilot's line of sight, and a command confirmation.

5. The method according to claim 1, comprising determining a field of view of the pilot as a function of the determined line of sight, and wherein the at least one complementary man-machine interface element is displayed in a free area located in the pilot's field of view.

6. The method according to claim 1, wherein the at least one part of the display maintained on the second man-machine interface contains non-geolocated information.

7. The method according to claim 1, further comprising determining free area(s) as a function of stored configuration information relative to the cockpit.

8. The method according to claim 7, wherein the display of at least one complementary element is done in at least one free area chosen as a function of the configuration information and the pilot's line of sight upon reception of the command to enter frozen mode.

9. A non-transitory storage medium comprising instructions executable by a processor, which, when executed by an electronic computing device, implement a display and interaction method according to claim 1.

10. A system for display and interaction with an aircraft control system intended for an aircraft pilot, embedded in a cockpit of the aircraft,
including a first man-machine interface called head-down and a first controller configured for controlling the display of the first man-machine interface,
and a second man-machine interface called head-up, and a second controller configured for controlling the display on the second man-machine interface,
the system further including a device configured to determine a line of sight of the pilot as a function of a position of the head and/or eyes of the pilot,
the second controller being configured in order, in a first standard display mode, to adapt at least one display on the second man-machine interface as a function of the pilot's line of sight,
the system comprising a control member able to be actuated by the pilot in order to change the display mode from the first standard display mode to a second, in which the second controller maintains at least part of the display on the second man-machine interface in a frozen position independently of the pilot's line of sight,
and a third controller suitable for displaying, in the second frozen display mode, at least one complementary man-machine interface element, as a function of the pilot's line of sight, in at least one free area of the cockpit, a free area being an area which is not already used by a display or interaction element,
the system further being configured to display a cursor representative of the pilot's line of sight in the second frozen display mode.

11. The method according to claim 1, further comprising, after receiving the command to change the display mode, sending the display mode selected to the first controller, to the second controller and to a third controller, and wherein the display of at least one complementary man-machine interface element is executed by the third controller.

12. The method according to claim 1, wherein in the second frozen display mode, the frozen position at which at least part of the display is maintained on the second man-machine interface is chosen according to the line of sight of the pilot at a time of reception of the command to enter the second frozen display mode.

* * * * *